United States Patent [19]

Sessody

[11] 3,880,046

[45] Apr. 29, 1975

[54] HYDRAULIC WORK SUPPORT OF THE COLLET TYPE

[75] Inventor: Donald W. Sessody, Milwaukee, Wis.

[73] Assignee: Applied Power Inc., Milwaukee, Wis.

[22] Filed: Apr. 15, 1974

[21] Appl. No.: 461,091

[52] U.S. Cl. ........................................ 279/4; 279/50
[51] Int. Cl. ............................................ B23b 31/30
[58] Field of Search ................. 279/4, 50, 57, 43, 74

[56] References Cited
UNITED STATES PATENTS
2,889,150  6/1959  Goldring et al. .......................... 279/4

3,632,122  1/1972  Sessody .................................. 279/4

*Primary Examiner*—Gil Weidenfeld
*Attorney, Agent, or Firm*—James E. Nilles

[57] ABSTRACT

The hydraulically actuated work support having a free floating collet which can be replaced with other collets of different capacity. Means are provided for insuring that the collet breaks free of its clamping seat when fluid pressure is relieved from the actuating piston.

3 Claims, 2 Drawing Figures

HYDRAULIC WORK SUPPORT OF THE COLLET TYPE

BACKGROUND OF THE INVENTION

Various types of hydraulically actuated work supports have been proposed including those which use a collet for grasping the plunger. One of the problems encountered in supports of this character is the wear or fretting on the seating surface of the collet which causes sticking of the collet on its seat and prevents or retards quick and complete release of the plunger when the holder is supposedly opened. Another shortcoming of some prior art devices is the fact that the collet in its axial shifting is not entirely free, for one thing it may be anchored by threads at its inner end, and some difficulty is experienced in the ability of the collet to properly and quickly find its seat by which it is clamped. Furthermore some of these prior artholders are limited to their capacity and lack the ability to be adapted to accommodate various sizes of work holding plungers.

SUMMARY OF THE INVENTION

The present invention provides a hydraulically actuated work holding support having a free floating plunger that can readily locate itself in its clamping seat. Another aspect of the invention relates to a holder of this type and in which resilient means are provided for insuring that the collet is released from its clamping jaws when the jaws are shifted to their release position. The holder and collet arrangement provided by the present invention contemplates replacement of collets of various sizes so as to quickly vary the capacity of the holder.

These and other objects and advantages of the present invention will appear hereinafter as this disclosure progresses, reference being had to the accompanying drawings.

DESCRIPTION OF A PREFERRED EMBODIMENT

Figure 1:
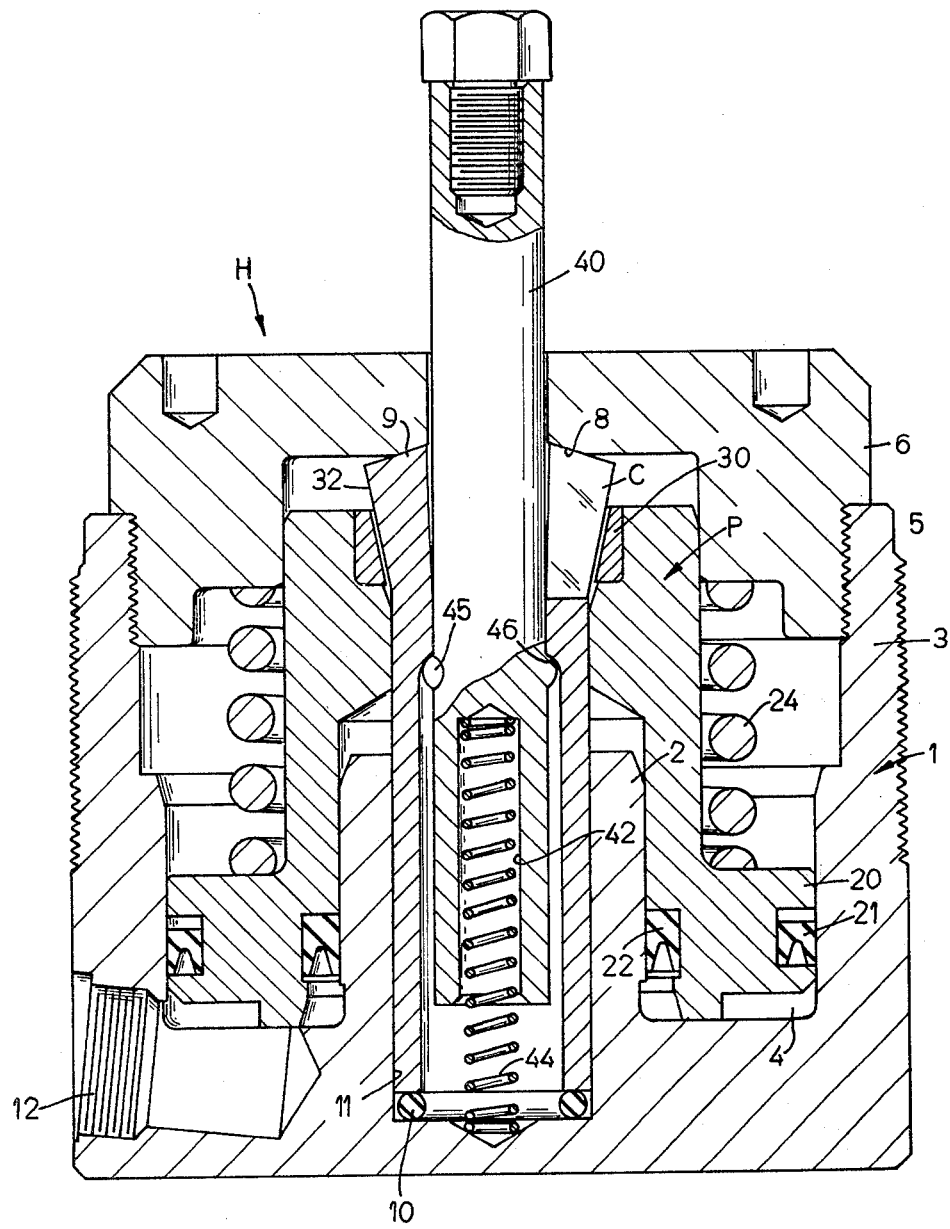
FIG. 1 is a longitudinal, cross section view through a holder embodying the present invention and showing the holder when in the plunger released position, certain parts being shown as broken away or in section for the sake of clarity in the drawings.

The holder H provided by the present invention includes a base member 1, having a central, cylindrical portion 2 which together with the side wall 3 of the base defines an annular piston chamber 4. The inner, upper end of the base is threaded as at 5 so as to threadably engage the stop ring or cap 6 that functions as a stop for the collet C. In other words, a stop surface 8 is provided at the upper, central portion of the cap 6 so that the upper end 9 of the collet can abut thereagainst when the collet is urged upwardly or to the released position by the resilient O-ring 10 that is located in the bottom end of a bore 11 which in turn is formed in the central portion of the hub 2 of the base.

The base also includes a threaded inlet opening 12 which is in communication with the chamber 4 so that pressure fluid can be directed into the chamber from a source (not shown) such as a hydraulic pump.

A collet actuating piston has a radially enlarged portion 20 slideably engaged in the annular chamber 4 and suitable flexible seals 21 and 22 are provided between the piston and the side walls of the chamber 4 so as to form a sealing sliding fit therewith. A large spring 24 bears against the portion 20 of the piston and also against the cap 6 and thus urges the piston downwardly or to the collet releasing position as shown in FIG. 1.

The piston at its upper end has a hardened steel insert 30 that is tapered so as to receive the complementary shaped surface 32 of the collet jaws. The collet has a number of jaws which are open when in the position shown in FIG. 1, that is to say the collet jaws 32 are free of their seat 30.

A central, work supporting plunger 40 extends centrally through the cap 6 and through the collet and has a counterbore 42 in its lower end and in which is seated the spring 44. The spring 44 bears against the base 1 and the plunger 40 urging it upwardly so that the stops 45 of the plunger bear against the shoulder 46 formed in the collet, thereby biasing the plunger 40 to its fully upward position in respect to the collet.

Figure 2:
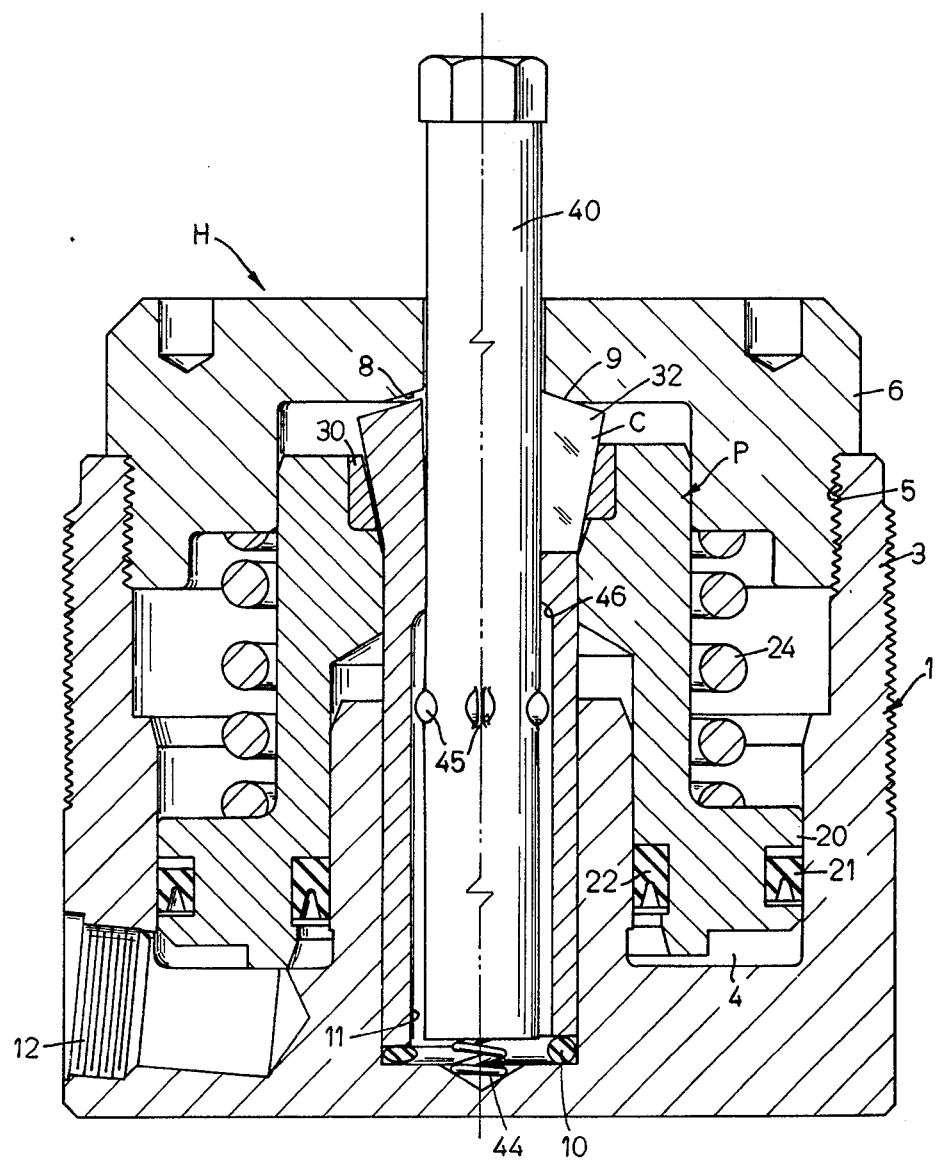
FIG. 2 is a view similar to FIG. 1, the left side of which shows the work holder in the open position and before the collet has been urged to its fully released position by the resilient means at the inner end of the collet, the right hand side showing the holder when its piston has been shifted to the collet clamping position, that is when the collet is closed.

As shown on the right hand side of FIG. 2, the piston P has been urged by fluid pressure in chamber 4 to its upward position so that its seat 30 clampingly engages against the jaws 32 of the collet C, thereby causing the collet to tightly grip the plunger 40. It will be noted that when the collet is in this position, the O-ring 10 is released or uncompressed.

As shown on the left side of FIG. 2, the collet is in the open position where it does not engage the plunger 40 nor are the collet jaws engaged by the hardened seat 30 of the piston. It will be noted that in this position, flexible O-ring 10 is compressed, as it would be immediately after a load was imposed on the plunger and when the latter had been engaged by the collet. The action of the O-ring however is such that immediately upon release of the collet by the piston, the O-ring assumes its normal, uncompressed position and then would urge the collet upwardly so that its jaws are separated from the collet seat 30.

The central spring 44 which urges the plunger upwardly can be varied as to its strength so as to have a variable rate.

The action of the holder is such that the O-ring 10 can act like a spring and thereby break the collet loose when the plunger is retracted and if the collet had become stuck in its seat.

The collet itself has no attaching threads at its inner end by which it is anchored to some other part, but instead, is free to float axially and quickly and easily find its seat 30 or alternatively, be released from the seat when the piston is shifted by its heavy spring 24 to the collet release position.

I claim:

1. A hydraulically actuated work support comprising, a base defining an annular piston actuating chamber, a piston slideably mounted in said chamber, said piston also having a collet clamping seat, a cap mounted on said base and having a central opening therethrough; an axially shiftable, free floating collet having plunger clamping jaws at its upper end and which are adapted to be clampingly engaged by said piston seat; a spring acting between said cap and said piston to bias the piston to a collet releasing position; a work supporting plunger extending through said cap and into said collet for being clamped thereby; resilient means acting between said base and said collet for urging the latter to an upper, plunger releasing position; passage means in said base for conducting pressure fluid to said piston actuating chamber whereby when said chamber is pressurized, said piston is urged to a collet closing position, and when said chamber is not pressurized, said spring urges said piston to a released position, said collet being freely slideable in said piston when the latter is released to thereby permit said resilient means to urge said collet out of engagement with said piston seat.

2. A hydraulically actuated work support comprising, a base having a cylindrical side wall and a central hub which together define an annular piston actuating chamber, a piston slideably mounted in said chamber, said piston having an upper portion which defines a collet clamping seat, a collet stop ring secured to said base, a spring acting between said ring and said piston to bias the piston to a collet releasing position, an axially shiftably, free floating collet having plunger clamping jaws at its upper end and which are adapted to be clampingly engaged by said piston seat, said collet being slideable in said hub of said base, resilient means acting between said base and said collet for urging the latter to an upper, plunger releasing position, and a work supporting plunger extending through said ring and into said collet for clamping thereby, passage means in said base for conducting pressure fluid to said piston actuating chamber whereby when said chamber is pressurized, said piston is urged against the bias of said spring and to a collet closing position and when said chamber is not pressurized, said spring urges said piston to a released position, said collet being freely slideable in said piston when the latter is released to thereby permit said resilient means to urge said collet out of engagement with said piston seat.

3. A hydraulically actuated work support comprising, a base, said base having a cylindrical side wall and a central hub which together define an annular piston actuating chamber, a central bore in said hub, a piston slideable in said base between collet closing and collet open positions, said piston having a lower portion slideably mounted in said chamber and against said wall and hub, said piston also having an upper portion which defines a collet clamping tapered seat, a cap threadably engaged in said base and having a central opening therethrough, a spring acting between said cap and said piston to bias the piston to a collet releasing position; an axially shiftably, free floating collet having plunger clamping jaws at its upper end and which are adapted to be clampingly engaged by said piston seat, said collet being slideable in said hub of said base; a resilient O-ring in said bore and acting between said base and said collet for urging the latter to an upper, plunger releasing position; and a work supporting plunger extending through said cap opening and into said collet for clamping thereby, fluid passage means for pressurizing said chamber to thereby urge said piston against the bias of said spring and to said collet closing position, and when said chamber is not pressurized, said spring urges said piston to said collet open position, said collet being freely slideable in said piston when the latter is in said open position to thereby permit said resilient O-ring to urge said collet out of engagement with said piston seat.

* * * * *